Figure 1:
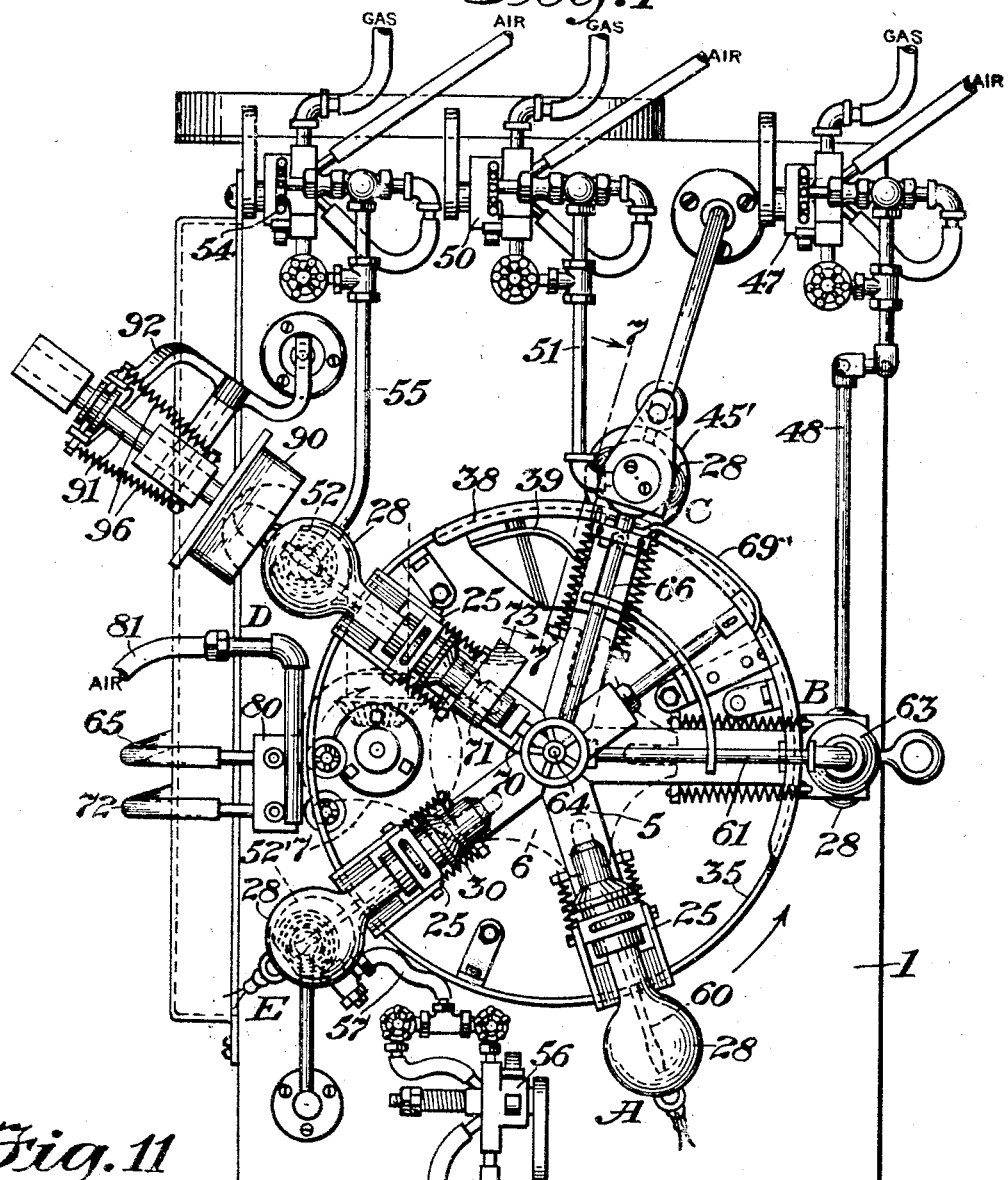

Feb. 14, 1933.  G. A. MILLAR  1,897,489
METHOD OF AND APPARATUS FOR PRODUCING VITREOUS ARTICLES
Filed Oct. 12, 1929  4 Sheets-Sheet 1

INVENTOR
George A. Millar
BY
Thos H Brown
HIS ATTORNEY

Feb. 14, 1933.  G. A. MILLAR  1,897,489
METHOD OF AND APPARATUS FOR PRODUCING VITREOUS ARTICLES
Filed Oct. 12, 1929  4 Sheets-Sheet 2

INVENTOR
George A. Millar
BY
Thos. H. Brown
HIS ATTORNEY

Feb. 14, 1933.　　　　　G. A. MILLAR　　　　　1,897,489
METHOD OF AND APPARATUS FOR PRODUCING VITREOUS ARTICLES
Filed Oct. 12, 1929　　　4 Sheets-Sheet 3

INVENTOR
George A. Millar
BY
HIS ATTORNEY

Feb. 14, 1933.  G. A. MILLAR  1,897,489
METHOD OF AND APPARATUS FOR PRODUCING VITREOUS ARTICLES
Filed Oct. 12, 1929  4 Sheets-Sheet 4
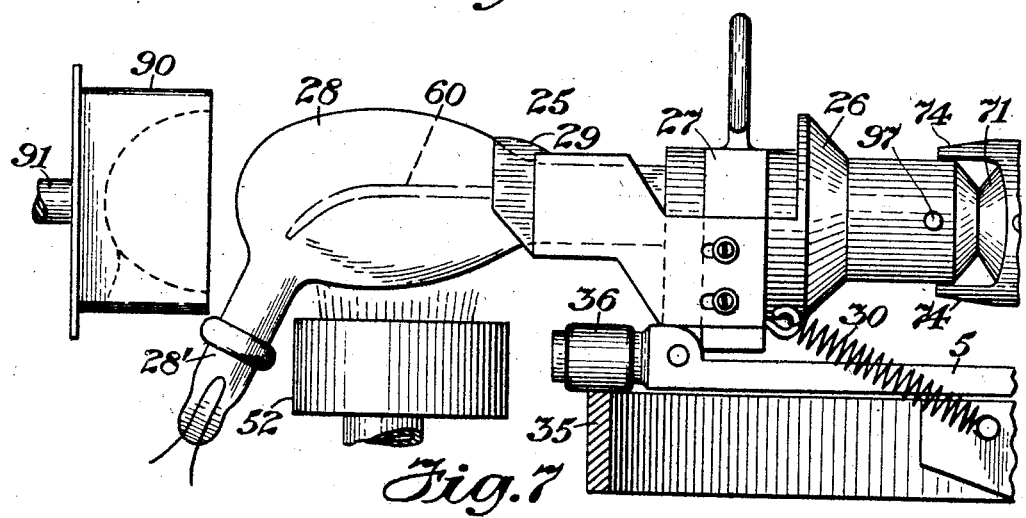
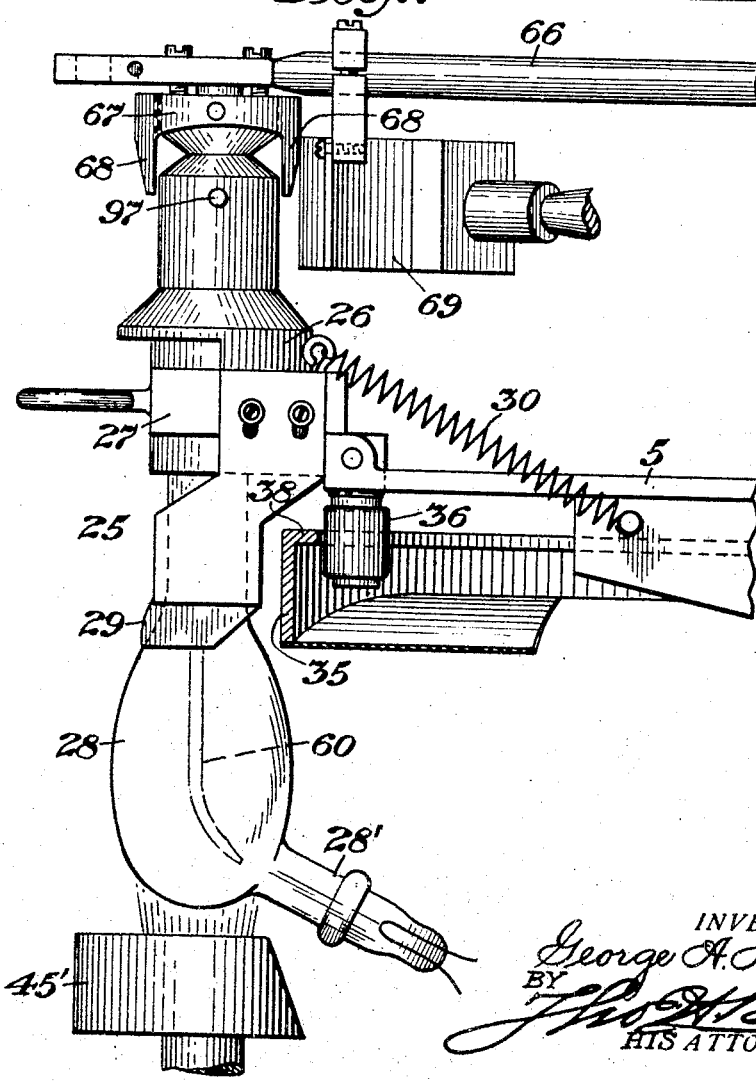
INVENTOR
George A. Millar
BY
HIS ATTORNEY Patented Feb. 14, 1933

1,897,489

UNITED STATES PATENT OFFICE

GEORGE A. MILLAR, OF RIDGEFIELD PARK, NEW JERSEY, ASSIGNOR TO GENERAL ELECTRIC VAPOR LAMP COMPANY, OF HOBOKEN, NEW JERSEY, A CORPORATION OF NEW JERSEY

METHOD OF AND APPARATUS FOR PRODUCING VITREOUS ARTICLES

Application filed October 12, 1929. Serial No. 399,230.

The present invention relates to the working of vitreous materials. A particular object of the invention is to provide a method and apparatus for softening predetermined areas of glass or other vitreous forms. A further object is to fuse another material into the softened area. Other objects and advantages will be obvious from the following particular description of the method and of one form of apparatus embodying the invention or from an inspection of the accompanying drawings.

The invention consists in the new method and in certain new and novel features of construction and combinations of parts hereinafter set forth and claimed.

While my invention is useful in the glass working art generally it is particularly useful in the manufacture of mercury arc devices. It has heretofore been proposed to fuse a granular material, such as carborundum, to the wall of these devices in such position as to break up the meniscus of the mercury cathode in order to facilitate the starting of the mercury arc. In practice this material has been confined to a small section of the meniscus due to the fact that the method heretofore employed of fusing the material to the glass by means of a hand torch distorted the glass envelope, this distortion becoming excessive if a large area of the envelope were softened. When so limited in area, the efficacy of the material in starting the arc was uncertain, since a slight tipping of the device might entirely remove the material from the cathode meniscus. The lack of uniformity in the product was also an objectionable feature.

Applicant has found that by using a gas burner of desired configuration, maintained in a definite position with respect to the glass envelope, it is possible to soften the glass over a large area without appreciable distortion of the glass. By this means it is possible to make carborundum, or other desired material, adhere to the glass in such a position that it will break up a considerable portion of the meniscus of the mercury cathode when the lamp is completed and in an operating position. According to my invention the glass envelope may be either placed on a suitable support above the special burner by hand, or the glass may be automatically positioned in the flames by power propelled apparatus. As a result of this invention not only has the process of applying the carborundum or other material been greatly simplified, but the product is far superior to that produced by the former method using only an ordinary gas torch, since the material may be distributed over an area heretofore found to be impracticable because of distortion, thus improving the starting characteristic of the device. Uniformity of product is now obtainable, especially with the power propelled apparatus, and is an important advantage. My invention also provides apparatus by means of which unskilled workers can perform an operation which has heretofore required operators of considerable skill and training.

Figure 11:
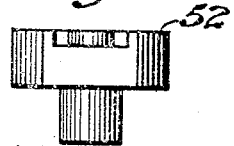
Figure 12:
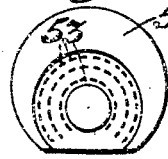
Figure 13:
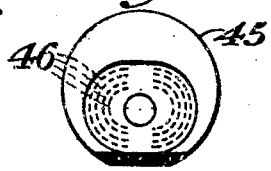
Figure 2:
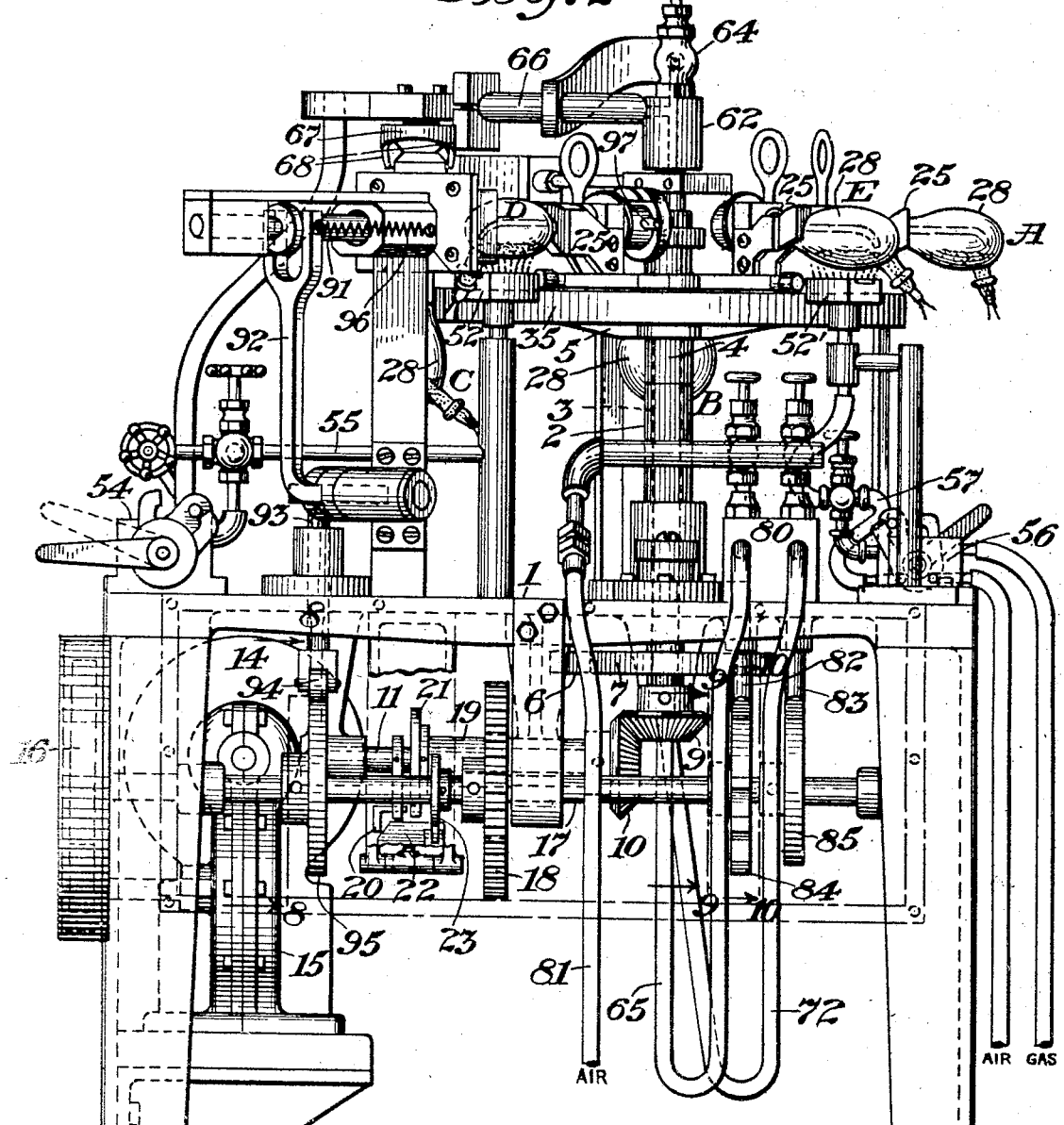
Figures 8, 9, 10:
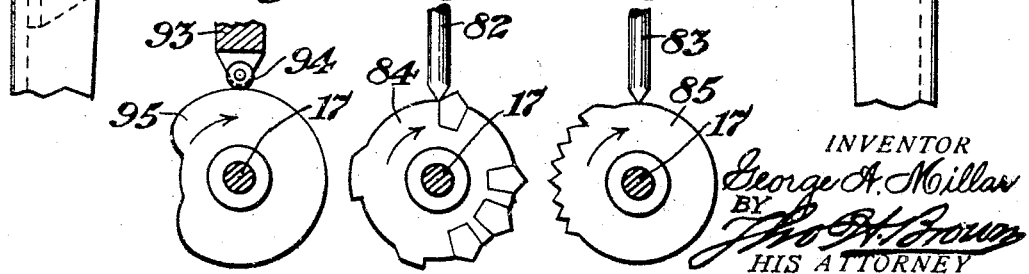
Figure 4:
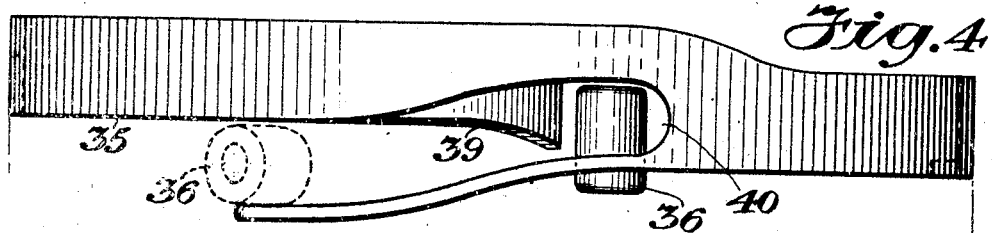
Figure 3:
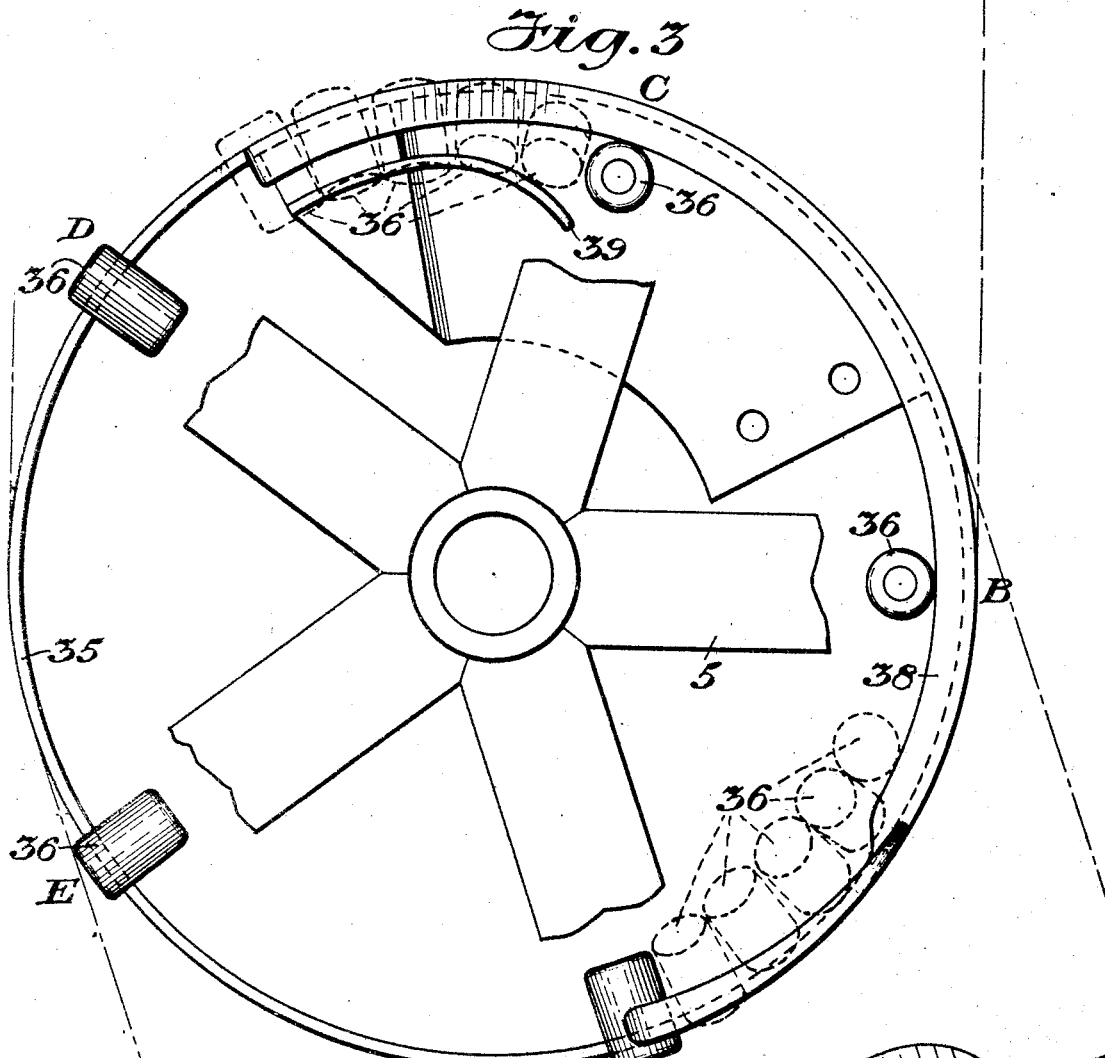
Figure 5:
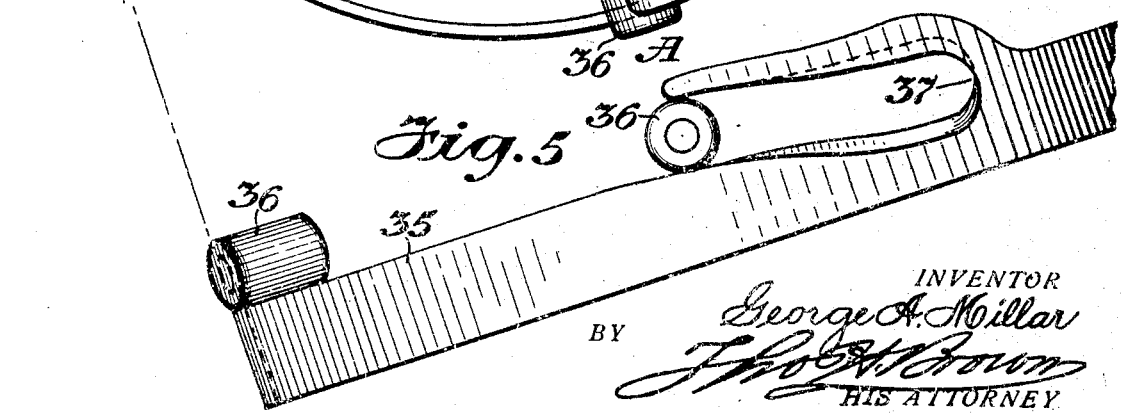

For purposes of illustration I have shown one form of apparatus for carrying out my new process in the accompanying drawings, in which Fig. 1 is a plan view of a preferred form of automatic machine for carrying out the process, Fig. 2 is an elevational view from the side of the same machine, with a protective casing removed, Fig. 3 is a detailed plan view of the cam ring used to position the glass bodies, Figs. 4 and 5 are each projections of the cam ring of Fig. 3 taken at the angles shown, illustrating details of the cam, Fig. 6 is a detail elevation of a carrier for the glass bodies at the forming position showing its relation to the cam ring, to the gas burner, to the air pressure system and to the forming member at that point, Fig. 7 is a detail sectional view taken at the line 7—7 of Fig. 1 showing the relation of a carrier at another rotational position to the cam ring, to the gas burner and to the air pressure system, Figs. 8, 9 and 10 are sectional views on the lines 8—8, 9—9 and 10—10 showing details of the cams which actuate the forming member and the two air valves, respectively, arranged in their proper relationship, Fig. 11 is an elevational view of one of the burners, used at the position shown in Fig. 6, Fig. 12 is a plan view of the same burner, and Fig. 13 is a plan view of a slightly different burner used at the position shown in Fig. 7.

In the drawings the bed plate 1 supports a centrally disposed vertical bearing 2 in which is journalled a hollow shaft 3. A collar 4 which is attached to the upper end of said shaft 3 rests upon the bearing 2 and thus supports said shaft, said collar also supporting a spider 5 which is attached thereto for rotation with said shaft 3. At its lower end the shaft 2 carries the indexing plate 6 of a Geneva gear, the cooperating dog 7 of said gear being carried by a shaft which is journalled in the bed plate 1, said shaft also carrying a bevel gear 9. Said gear 9 is driven by a gear 10 on the horizontal counter shaft 11, said shaft being suitably supported below the bed plate 1. An electric motor 14 through a suitable reduction gear 15 and the gear train 16 drives the cam shaft 17 which is suspended from the bed plate 1. A gear 18 on said shaft 17 cooperates with a smaller gear (not shown) on a sleeve 19 which is mounted on the shaft 11 to continuously rotate said sleeve. A spring actuated dog 20 carried by the shaft 11 is adapted to engage a suitable opening in a flange 21 on said sleeve 19, whereby said shaft 11 is made to rotate with said sleeve 19, but on rotation said dog 20 is engaged by a pivoted cam 22 which forces said dog out of engagement with the flange 21 after one revolution of the said dog. A cam 23 is provided on the cam shaft 17 to depress the cam 22 once during each revolution of said shaft 17, in order to allow the dog 20 to reengage the flange 21. With this construction continuous rotation of the motor 14 results in the intermittent rotation of the driving dog 7, with the result that the spider 5 is indexed from one position to another with a relatively small loss of time.

At the outer end of each of the five legs of the spider 5 there is pivotally mounted a work holding assembly 25 as shown in Figs. 6 and 7. Each of these assemblies comprises a main supporting member 26 to which there is attached by means of springs (not shown) a clamping member 27, whereby the tubular neck of a glass bulb 28, on the inside of which the granular substance is to be embedded, may be suitably gripped. The portions of said members 26 and 27 which contact with the glass are preferably covered with pads of asbestos or other suitable heat insulating material, both to prevent too rapid conduction of heat from the glass and to make the connection between the member 26 and the neck of the bulb 28 substantially air tight. Two asbestos blocks 29, suitably supported by the member 26, are adapted to rest against the bulb 28 in order to accurately fix the position of said bulb with respect to the various parts of the apparatus. A tension spring 30, one end of which is attached to the member 26 some distance from the point at which it is pivotally supported by the spider 5 while the other end is attached to the supporting arm of the spider, tends to maintain the work holding assembly 25 with its axis substantially horizontal.

By means of suitable supports on the bed plate 1 a cam ring 35 of slightly greater diameter than the spider 5 is mounted concentrically with said spider and just below the level thereof. Said cam ring 35 cooperates with a roller 36 on each of the work holders 25 to either support said work holder 25 in a horizontal position or to move said work holder 25 to a vertical position. With particular reference to Figs. 3, 4 and 5 it will be seen that at the loading position A, which is at a rest position of the spider 5, the roller 36 rests upon the cam rail 35 and thereby maintains the work holder 25 horizontal. As the spider 5 moves to bring that particular work holder 25 to position B the roller 36 is engaged by the upper edge of a slot 37 in the cam ring 35, which forces said roller downwardly and inwardly to a vertical position. The inwardly projecting flange 38 then engages said roller 36 and holds it in a vertical position against the tension of spring 30. It is thus apparent that when the work holder 25 arrives at position B it will be in a vertical position. As the work holder 25 is further rotated to position C a continuation of the flange 38 maintains the roller 36 and thus the work holder 25, in a vertical position. As the spider 5 again rotates to move the work holder 25 from the position C to position D the roller 36 engages a cam surface 39 which forces said roller outwardly and upwardly into the slot 40 until it again rides in a horizontal position upon the upper edge of the cam ring 35, the work holder 25 being thereby restored to a horizontal position. Upon the further rotation of the work holder 25 from positions D to E, and from position E to the loading position A, completing the cycle, the roller 36 continues to ride on the upper surface of the cam ring 35, the work holder 25 being thereby continuously maintained in a horizontal position.

At position B there is provided a gas burner 45 (see Fig. 13) said burner being located directly below the position taken by a bulb 28 carried by a work holder 25 at said position B. Suitable orifices 46 are arranged in the upper surface of said burner 45 according to the configuration of the area to be softened on the glass bulb 28. Gas and air are supplied to said burner from suitable sources through the proportioning valve 47 and the pipe 48. A similar burner 45' is located at position C in a position to heat the same area of a glass bulb 28 as was heated by the burner 45 at position B. Burner 45' is supplied in a like manner with air and gas from suitable sources through the proportioning valve 50 and pipe 51. At position D there is installed a gas burner 52 (see Figs. 11 and 12) having orifices 53 therein which are designed to direct the flames from said burner against the particular parts of a bulb 28 positioned thereabove which are to be heated in order to fuse the granular substance thereto. Said burner 52 is supplied with gas and air from suitable sources through the proportioning valve 54 and pipe 55. A similar burner 52' is located at the rest position E, the flames therefrom being directed against the same area of a glass bulb 28 as was heated by the burner 52, gas and air being supplied to said burner 52' from suitable sources through the proportioning valve 56 and the tubing 57.

In each of the work holders 25 there is an air tube 60, one end of which is adapted to extend into a glass bulb 28 held by said work holder 25, preferably terminating near and being directed toward the chamber 28' thereof, in which the granular substance employed tends to accumulate. The other end of said air tube 60 is connected to a suitable port (not shown) in the end of the member 26.

At position B an air pipe 61 is carried by a hollow support 62 which extends through the hollow shaft 3 to a supporting bracket (not shown) below the bed plate 1. At its outer end said pipe 61 terminates in a downwardly extending member 63 having a port therein which registers with the air port in the work holding member 26 which is at said position B. In order to avoid the escape of air the member 63 is preferably resiliently supported so as to fit snugly against the member 26. Connection from the inner end of the pipe 61 is made through a valve 64 to a tube 65 which extends through the hollow support 62.

Similarly, at position C there is an air pipe 66 which is likewise carried by the support 62 and which terminates in the downwardly extending member 67 (see particularly Fig. 7). An air port in said member 67 (not shown) registers with the air port in the work holding member 26 which is at rest at said position C. The inner end of said air pipe 66 is likewise connected to said tube 65. The member 67 is resiliently attached to the connecting pipe by which it is supported, so as to insure a snug connection with each of the work holders 25, and has lugs 68 which guide the work holders into proper relation with said member 67. A spring supported member 69 is also provided to guide the work holders 25 between said lugs 68 as each of said work holders 25 is rotated to this position.

At position D there is a similar provision for the admission of air to the bulb 28. A pipe 70 which is carried by the support 62 terminates in the member 71, a port therein (not shown) registering with the port in the end of the work holding member 26 which is at said position D. The inner end of said pipe 70 is connected to a tube 72 which extends downwardly through the hollow support 62. A guide member 73 and lugs 74 are provided to insure accurate registration of the ports in the members 26 and 71. The member 71 is also preferably resiliently mounted in order to rest snugly against the member 26.

The tubes 65 and 72 terminate in separate passages of the valve block 80 which is mounted on the bed plate 1 directly above the cam shaft 17, said passages also being connected to a suitable source of air under pressure through the pipe 81. The flow of air through said passages from said source to the tubes 65 and 72 is controlled by plungers 82 and 83, respectively, these plungers being normally maintained in the closed position by springs (not shown). Cams 84 and 85 which are mounted on the cam shaft 17 cooperate with the plungers 82 and 83, respectively, permitting the flow of air to tubes 65 and 72 at predetermined intervals. Figs. 9 and 10 show the position of the cams 84 and 85 at the end of a rest period of the spider 5. While the rotation of the cam shaft 17 causes movement of the spider 5 to a new position of rest the cams 84 and 85 rotate without any effect on the plungers 82 and 83, but as soon as the spider 5 comes to rest cam 85 lifts the plunger 83 and holds it for an appreciable period, say several seconds, thus allowing the application of the air pressure to the bulb 28 at position D. Following this the cam 85 is so shaped as to cause a series of momentary actuations of the plunger 83, each of which allows the flow of air for a short interval to said bulb 28. In like manner the cam 84 actuates the plunger 82 to allow the passage of air to the bulbs 28 at positions B and C for two periods of several seconds each separated by a longer period, following which are several spaced projections which cause air to be intermittently admitted to said bulbs for short periods the last of which occurs just before rotation of the spider 5. These particular sequences of "blowing" have been found to be the most effective to distribute the granular substance in the bulbs 28 over the softened portions of said bulbs. The first long application of air to the bulb 28 at position D is for the purpose of forcing the softened portions of the walls thereof outward, since they tend to collapse upon the application of the flames. To further control the shape of these bulbs a mold 90 of graphite or other suitable material is carried by a rod 91 which is slidably supported above the bed plate 1 at position D, provision being made for a slight rotation of said mold also. A crank 92 which is pivotally supported by the bed plate 1 engages the rod 91 in a convenient manner at one end, while the other end of said crank 92 rests upon a plunger 93 which passes through the bed plate 1. At its lower end said plunger 93 carries a roller 94 which rides upon a cam 95 carried by the cam shaft 17. Said cam 95 is so shaped that it allows the plunger 93 to move downward just after the first long application of air to the bulb 28 at position D. Tension springs 96, which are attached to the rod 91 thereupon move the mold 90 into yieldable contact with the softened walls of the bulb 28, forcing them into the desired shape.

For purposes of distributing the granular substances within the bulbs 28 it is desirable that there should be an appreciable flow of air from the tubes 60 when air pressure is applied to the connecting tubes, hence there must be a means for the escape of air from said bulbs. In most cases it is found that the leakage within the work holders 25 is sufficient for this purpose, especially since excessive venting of the bulbs 28 will prevent the proper expanding of the bulb 28 at position D. In certain cases, however, it may be desired to remove the plugs 97 with which a vent in each of the work holders 25 is closed. In this case suitable means should be provided to close the vent in the work holder 25 which is at position D during the first application of the air pressure to the bulb 28, in order to effectively build up the air pressure in said bulb.

In the use and operation of the above apparatus to perform my new process, the motor being running and all flames burning, a bulb 28 containing a suitable quantity of the desired granular substance is slipped over the air pipe 60 and clamped within the work holder 25 which is at position A by suitable actuation of the clamping member 27. After an interval of about thirty seconds this bulb 28 will be rotated toward position B. During this rotation the cam ring 35 with the aid of slot 37 and flange 38, causes the work holder 25 to move to a vertical position, the bulb 28 thereby being positioned over the burner 45 with the end thereof exposed to the flames from said burner. During the rest period of the spider 5 at this position air is repeatedly introduced into the bulb 28 by means of the pipe 60 to distribute the granular material over the heated area of said bulb 28, resulting in the embedding of said material in the softened glass. The spider 5 then again rotates carrying the bulb 28 to position C, the flange 38 maintaining the bulb 28 in a vertical position during this movement. At said position C the bulb 28 comes to rest over the burner 45', the treatment being identical with that received at position B. After the usual rest period at this position the spider 5 again rotates, bringing the bulb 28 to position D. During this movement the cam surface 39 and slot 40 cause the return of the bulb 28 to a horizontal position, so that at said position D the bottom of said bulb 28 is exposed to the flames from the burner 52. As said bulb 28 comes to rest the air pressure is increased as a result of the action of cam 86, forcing outward the portions of the wall of said bulb 28 which were softened by the burner 45'. Immediately thereafter the mold 90 is forced against the expanded bulb 28 by action of the springs 96 and cam 95, forcing the walls thereof back to the desired shape. Following this air is again introduced into the bulb 28 through the pipe 60 at repeated intervals through the action of the cam 85, the granular substance being distributed over the newly softened areas thereby, with the result that some of said material is embedded in the softened glass. Further rotation of the spider 5 brings bulb 28 to position D, cam ring 35 maintaining said bulb 28 horizontal during this rotation. The bottom of said bulb 28 is thereupon subjected to flames from the burner 52' which cause a further embedding of the granular substance in the bottom thereof, no air being supplied at this position. After the usual rest interval the spider rotates the bulb 28 back to position A where it is removed by releasing the clamping member 27, another bulb 28 being substituted therefor. It is to be understood, of course, that during the cycle described above each of the other work holders 25 contains a bulb 28 which is passed, in turn, through the same cycle.

In practice it has been found advisable to preheat the bulbs 28 before placing them on the machine, and to anneal or slowly cool them after removal, in order to minimize breakage thereof due to internal strains.

While my process has been described as being performed by machine it is obvious that the steps thereof could be performed by hand, were it so desired. It is also to be understood that the apparatus and process set forth above are for purposes of illustration only, and that various changes, omissions and substitutions, either in the steps of the process or in the apparatus, within the scope of the appended claims, may be made without departing from the spirit of my invention.

I claim:

1. The method of working a vitreous body which comprises applying a measured quantity of heat to predetermined portions thereof, distributing a granular substance over said portion of said body, and shaping said body while heated.

2. The method of working a vitreous body which comprises softening predetermined portions of said body, distributing a granular substance over said softened portions and removing any deformities in said body resulting from the softening thereof.

3. In apparatus for fusing a granular substance to a vitreous body, in combination, means to support said vitreous body, means to apply a measured quantity of heat to predetermined portions of said body, and intermittently operated means to distribute a granular substance over said portions at predetermined time intervals during the heating thereof.

4. In apparatus for fusing a granular substance to the interior of a hollow vitreous body, in combination, means to support said vitreous body, means to apply a measured quantity of heat to predetermined portions thereof, means to distribute a granular substance over said portions, and means to shape said vitreous body while heated.

5. In apparatus for fusing a granular substance to the interior of a hollow vitreous body, in combination, means to support said vitreous body, means to apply a measured quantity of heat to predetermined portions thereof, means to distribute a granular substance over said portions, and means to expand said body while heated.

6. In apparatus for fusing a granular substance to the interior of a hollow vitreous body, a plurality of fires of distinctive configuration, means to automatically position said vitreous body in each of said fires for a predetermined period, means to distribute a granular substance over the heated portions of said vitreous body at predetermined times during the heating thereof, and means to shape said vitreous body while heated.

Signed at Hoboken in the county of Hudson and State of New Jersey this 11th day of October A. D. 1929.

GEORGE A. MILLAR.